US012589693B2

(12) United States Patent (10) Patent No.: US 12,589,693 B2
Nakazawa et al. (45) Date of Patent: Mar. 31, 2026

(54) VEHICULAR LAMP, CONTROL DEVICE AND CONTROL METHOD FOR VEHICULAR LAMP, VEHICULAR LAMP SYSTEM, AND CONFIGURATING DEVICE AND CONFIGURATING METHOD FOR VEHICULAR LAMP

(71) Applicant: Koito Manufacturing Co., Ltd., Tokyo (JP)

(72) Inventors: Yuichi Nakazawa, Shizuoka (JP); Yuichi Watano, Shizuoka (JP); Yuta Maruyama, Shizuoka (JP); Takahiro Totsuka, Shizuoka (JP); Yasushi Ohtsuka, Shizuoka (JP)

(73) Assignee: KOITO MANUFACTURING CO., LTD., Shinagawa-Ku (JP)

( * ) Notice: Subject to any disclaimer, the term of this patent is extended or adjusted under 35 U.S.C. 154(b) by 16 days.

(21) Appl. No.: 18/616,459

(22) Filed: Mar. 26, 2024

(65) Prior Publication Data

US 2024/0227671 A1 Jul. 11, 2024

Related U.S. Application Data

(63) Continuation of application No. PCT/JP2022/037017, filed on Oct. 3, 2022.

(30) Foreign Application Priority Data

Oct. 4, 2021 (JP) ................................. 2021-163558
Oct. 4, 2021 (JP) ................................. 2021-163559

(51) Int. Cl.
B60Q 11/00 (2006.01)
B60Q 1/26 (2006.01)
(Continued)

(52) U.S. Cl.
CPC .......... B60Q 11/007 (2013.01); B60Q 1/2607 (2013.01); B60Q 1/30 (2013.01);
(Continued)

(58) Field of Classification Search
CPC ...... B60Q 11/007; B60Q 1/2607; B60Q 1/30; B60Q 1/34; B60Q 1/44; B60Q 2300/114; B60Q 2900/50
See application file for complete search history.

(56) References Cited

U.S. PATENT DOCUMENTS 10,358,085 B2 * 7/2019 Kim ..................... B60Q 1/1438
2012/0294020 A1 11/2012 Kasaba et al.
(Continued)

FOREIGN PATENT DOCUMENTS

DE 102004024514 A1 * 12/2005 ............... B60Q 1/34
FR 2957865 A1 9/2011
(Continued)

OTHER PUBLICATIONS

International Preliminary Report on Patentability Chapter I (PCT/IB/373) and Written Opinion (PCT/ISA/237) with translation mailed on Apr. 9, 2024 by the International Bureau of WIPO in corresponding International Patent Application No. PCT/JP2022/037017. (8 pages).
(Continued)

*Primary Examiner* — Mohamed Barakat
(74) *Attorney, Agent, or Firm* — BUCHANAN, INGERSOLL & ROONEY PC

(57) ABSTRACT

A vehicular lamp apparatus includes: a lamp unit; a controller that controls the lamp unit based on vehicle information received from a vehicle; and an acceleration sensor that provides information indicating vehicle acceleration to the controller. The controller detects whether or not reception of the vehicle information is interrupted and controls the lamp (Continued)

unit based on the vehicle acceleration when interruption in the reception of the vehicle information is detected.

6 Claims, 7 Drawing Sheets

(51) Int. Cl.
| | | |
|---|---|---|
| *B60Q 1/30* | (2006.01) | |
| *B60Q 1/34* | (2006.01) | |
| *B60Q 1/44* | (2006.01) | |

(52) U.S. Cl.
CPC ................. *B60Q 1/34* (2013.01); *B60Q 1/44* (2013.01); *B60Q 2300/114* (2013.01); *B60Q 2900/50* (2022.05)

(56) References Cited

U.S. PATENT DOCUMENTS

| | | | |
|---|---|---|---|
| 2015/0158413 A1 | 6/2015 | Tatara | |
| 2017/0060234 A1 * | 3/2017 | Sung ..................... G06F 3/1423 |

| | | | | |
|---|---|---|---|---|
| 2017/0297477 A1 * | 10/2017 | Kasaba | .................. | B60Q 1/115 |
| 2020/0384913 A1 * | 12/2020 | Nobuhara | .............. | B60K 35/22 |
| 2022/0009404 A1 * | 1/2022 | Kurebayashi | .......... | H05B 45/30 |

FOREIGN PATENT DOCUMENTS

| | | | |
|---|---|---|---|
| GB | 2570133 A | | 7/2019 |
| JP | 2012240512 A | | 12/2012 |
| JP | 2015110365 A | | 6/2015 |
| JP | 2016040159 A | | 3/2016 |
| JP | 5949308 B2 | * | 7/2016 |
| KR | 101484115 B1 | * | 1/2015 |

OTHER PUBLICATIONS

International Search Report (PCT/ISA/210) with translation mailed on Nov. 22, 2022 by the Japanese Patent Office as the International Searching Authority for International Application No. PCT/JP2022/037017. (5 pages).

Office Action (Communication pursuant to Rule 164(1) EPC/The Partial Supplementary European Search Report) issued on Nov. 26, 2024, in corresponding European Patent Application No. 22878484.9. (13 pages).

* cited by examiner

250

VEHICULAR LAMP, CONTROL DEVICE AND CONTROL METHOD FOR VEHICULAR LAMP, VEHICULAR LAMP SYSTEM, AND CONFIGURATING DEVICE AND CONFIGURATING METHOD FOR VEHICULAR LAMP

CROSS-REFERENCE TO RELATED APPLICATIONS

This application is the continuation of International Patent Application No. PCT/JP2022/037017, filed on Oct. 3, 2022, which claims the benefit of priority from Japanese Patent Application No. 2021-163558, filed on Oct. 4, 2021 and Japanese Patent Application No. 2021-163559, filed on Oct. 4, 2021, the entire content of each of which is incorporated herein by reference.

BACKGROUND

Technical Field

The present invention relates to a vehicular lamp apparatus, a control device and a control method for a vehicular lamp apparatus. The present invention also relates to a vehicular lamp system, a configurating device and a configurating method for a vehicular lamp apparatus.

Description of Related Art

It has been conventionally known that a lamp Electronic Control Unit (ECU) for controlling rear combination lamps is connected to a vehicle ECU for controlling the entire vehicle and controls the lamps based on information input from the vehicle ECU. To the vehicle ECU, various sensors such as a vehicle speed sensor are connected, and information detected by the sensors, such as vehicle speed, is input from the vehicle ECU to the lamp ECU (see Patent Literature 1, for example).

Patent Literature 1 describes a vehicle panel module that includes rear combination lamps and an image display device adjacent thereto. Each of the rear combination lamps includes three light sources, constituted by full-color LEDs, that function as a tail/stop lamp, a backup lamp, and a turn signal lamp, respectively. In this device, although each lamp is lit as it should be while the vehicle is traveling, it is different while the vehicle is parked; each lamp can be lit decoratively in various colors, brightness, and timing, and various images can be displayed on the image display device.

Patent Literature 1: Japanese Unexamined Patent Application Publication No. 2016-40159

In general, the vehicle ECU and the lamp ECU are connected by communication lines such as wire harnesses, and information is transmitted between the ECUs via the communication lines. If the communication between the vehicle ECU and the lamp ECU is interrupted due to communication line disconnection or some other communication error, the lamp ECU cannot acquire information from the vehicle ECU. Accordingly, vehicular lamps, such as rear combination lamps, controlled by the lamp ECU will not operate because information necessary to perform the control cannot be acquired.

SUMMARY

An illustrative purpose of one embodiment of the present invention is to provide a vehicular lamp apparatus with a fail-safe function.

In some cases, a vehicular lamp apparatus that includes multiple marker lamps can be realized by defining regions that operate as marker lamps including tail lamps and turn signal lamps, on an array of a number of light emitting elements, such as a display. When these regions on the display are operated as marker lamps, they must satisfy the requirements stipulated by law. Therefore, the region setting is typically performed by the manufacturer of the vehicular lamp apparatus at the manufacturing stage. If users were also allowed to customize this setting, the users would be able to change the appearance of their vehicular lamps according to their own preferences, which could lead to increased user satisfaction. As a matter of course, a vehicular lamp customized by a user must also satisfy the requirements stipulated by law. However, it is actually not easy for a user who does not know such requirements to customize the setting such as to satisfy the requirements.

An illustrative purpose of one embodiment of the present invention is to assist a user to customize a vehicular lamp while satisfying the legal requirements.

A vehicular lamp apparatus according to one embodiment of the present invention includes: a lamp unit; a controller that controls the lamp unit based on vehicle information received from a vehicle; and an acceleration sensor that provides information indicating vehicle acceleration to the controller. The controller detects whether or not the reception of the vehicle information is interrupted and controls the lamp unit based on the vehicle acceleration when interruption in the reception of the vehicle information is detected.

According to this embodiment, even when the vehicle information used to control a lamp unit cannot be acquired, the lamp unit can be operated based on the vehicle acceleration information provided from the acceleration sensor. Therefore, the vehicular lamp apparatus can be provided with a fail-safe function.

The acceleration sensor may be built into the controller. Accordingly, compared to the case where the acceleration sensor is provided outside the controller, the risk of the controller being unable to acquire the vehicle acceleration information due to communication failure between the acceleration sensor and the controller, for example, can be reduced. Therefore, the fail-safe function using the acceleration sensor can be provided more certainly.

The lamp unit may include a plurality of marker lamps that provide lamp functions different from each other. Also, the controller may select a marker lamp from among the plurality of marker lamps based on the vehicle acceleration and may control the marker lamp thus selected. Accordingly, even when the vehicle information cannot be acquired, the traveling state of the vehicle, such as decelerating, backing up, or turning right or left, can be grasped based on the vehicle acceleration, and a marker lamp appropriate for the state thus grasped can be turned on.

The lamp unit may include a tail lamp. The controller may turn on the tail lamp when interruption in the reception of the vehicle information is detected. Accordingly, even when the vehicle information cannot be acquired, a tail lamp can be automatically turned on. This helps improving safety, especially at night.

Another embodiment of the present invention is a control device for a vehicular lamp apparatus. The apparatus includes: an Electronic Control Unit (ECU) that controls a lamp unit based on vehicle information received from a vehicle; and an acceleration sensor that provides information indicating vehicle acceleration to the ECU. The ECU detects whether or not the reception of the vehicle information is interrupted and controls the lamp unit based on the vehicle acceleration when interruption in the reception of the vehicle information is detected.

Yet another embodiment of the present invention is a control method for a vehicular lamp apparatus. The method includes: detecting whether or not reception of vehicle information for use in control of a lamp unit is interrupted; acquiring information indicating vehicle acceleration from an acceleration sensor; and controlling the lamp unit based on the vehicle acceleration when interruption in the reception of the vehicle information is detected.

A vehicular lamp system according to a second embodiment of the present invention includes: a lamp unit including a plurality of marker lamp regions, each operable as a different marker lamp, the plurality of marker lamp regions being customizable in arrangement; a configurator that receives a customization of the plurality of marker lamp regions in arrangement and that generates a customized configuration indicating customized arrangement of the plurality of marker lamp regions; and a controller that controls the lamp unit to define the plurality of marker lamp regions in the lamp unit according to the customized configuration and to operate the plurality of marker lamp regions each as the different marker lamp. The configurator displays a settable area that is allowed to be used as a marker lamp region for each marker lamp when receiving the customization.

According to this embodiment, the user can customize the arrangement of a marker lamp region while grasping the settable area. The settable area can be defined in advance according to the legal requirements. Therefore, it is possible to assist a user to customize a vehicular lamp while satisfying the legal requirements.

The configurator may display a non-settable area that is prohibited to be used as the marker lamp region for each marker lamp together with the settable area when receiving the customization. Accordingly, the user can grasp a settable area and a non-settable area. Therefore, it becomes easier for the user to customize a vehicular lamp such as to satisfy the legal requirements.

The configurator may receive a customization of the plurality of marker lamp regions in arrangement and lighting mode, and the customized configuration may indicate the customized arrangement and lighting mode of the plurality of marker lamp regions. Accordingly, the user can change not only the arrangement of a marker lamp region but also the lighting mode thereof. Therefore, the user can customize a vehicular lamp so that it suits his or her preference even more, which can lead to further improvement of user satisfaction.

Another embodiment of the present invention is a configurating device for a vehicular lamp apparatus. The vehicular lamp apparatus includes a lamp unit including a plurality of marker lamp regions, each operable as a different marker lamp, the plurality of marker lamp regions being customizable in arrangement. The configurating device includes: an input interface that receives a customization of the plurality of marker lamp regions in arrangement; a display that displays a settable area that is allowed to be used as a marker lamp region for each marker lamp when the customization is received; and a processor that generates a customized configuration indicating customized arrangement of the plurality of marker lamp regions.

Yet another embodiment of the present invention is a setting method for a vehicular lamp apparatus. The vehicular lamp apparatus includes a lamp unit including a plurality of marker lamp regions, each operable as a different marker lamp, the plurality of marker lamp regions being customizable in arrangement. The method includes: receiving in a configurator a customization of the plurality of marker lamp regions in arrangement; displaying on the configurator a settable area that is allowed to be used as a marker lamp region for each marker lamp when the customization is received; and generating by the configurator a customized configuration indicating customized arrangement of the plurality of marker lamp regions.

Optional combinations of the aforementioned constituting elements, and implementation of the present disclosure in the form of methods, apparatuses, systems, and computer programs may also be practiced as additional modes of the present invention.

BRIEF DESCRIPTION OF DRAWINGS

FIG. 7A and FIG. 7B are each a schematic diagram that shows an example of a settable area and a non-settable area according to the second embodiment.

DETAILED DESCRIPTION

Figure 1:
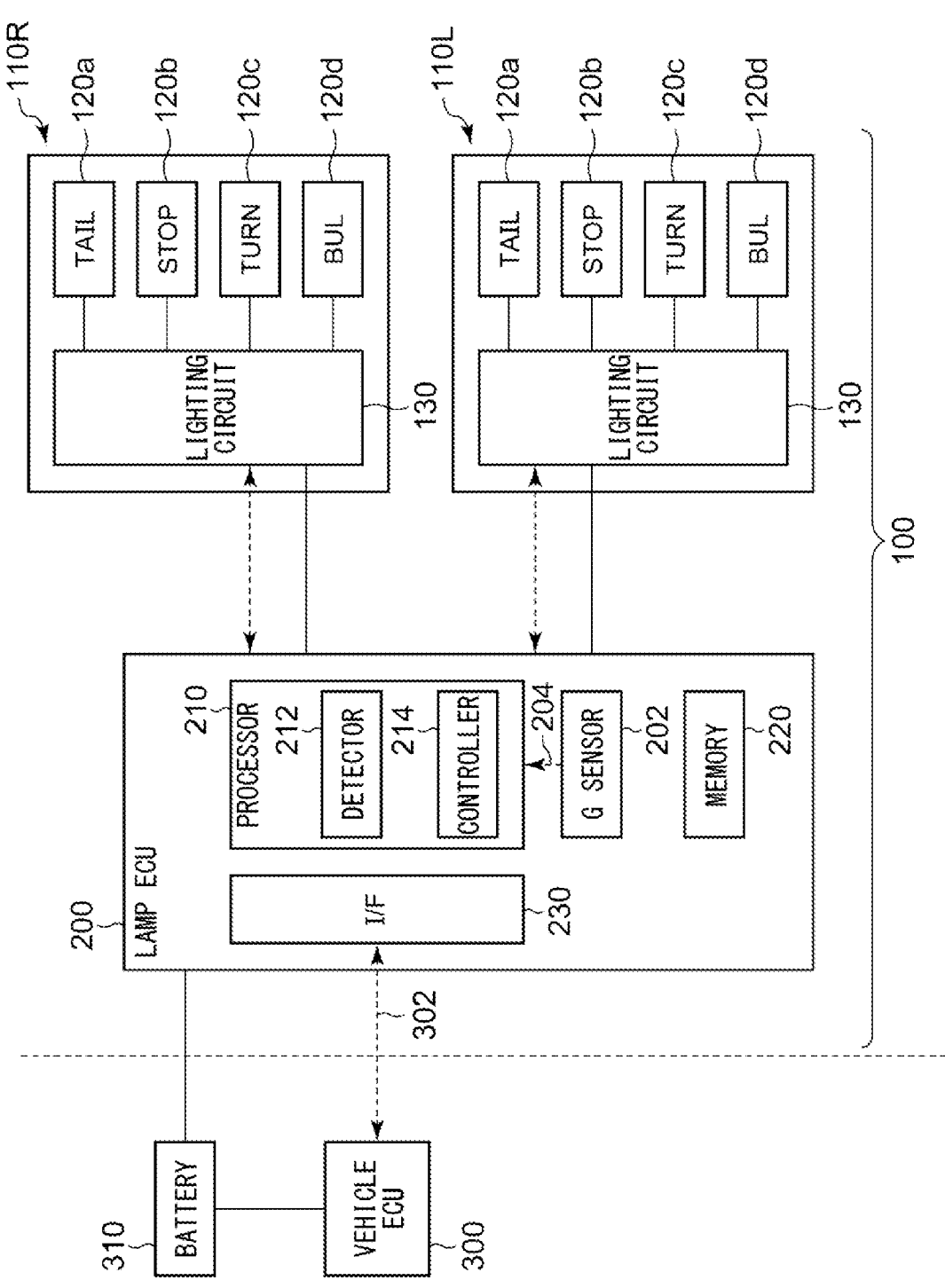
FIG. 1 is a block diagram of a vehicular lamp apparatus according to a first embodiment.

The invention will now be described by reference to the preferred embodiments. This does not intend to limit the scope of the present invention, but to exemplify the invention.

In the following, the present invention will be described based on preferred embodiments with reference to the drawings. The embodiments are intended to be illustrative only and not to limit the invention, so that it should be understood that not all of the features or combinations thereof described in the embodiments are necessarily essential to the invention. Like reference characters denote like or corresponding constituting elements, members, and processes in each drawing, and repetitive description will be omitted as appropriate. Also, the scale or shape of each component shown in each drawing is defined for the sake of convenience to facilitate the explanation and is not to be regarded as limitative unless otherwise specified. Also, the terms "first", "second", and the like used in the present specification or claims do not imply any order or degree of importance and are employed to distinguish one configuration from another. Further, in each drawing, part of a member less important in describing the embodiments may be omitted.

First Embodiment

FIG. 1 is a block diagram of a vehicular lamp apparatus 100 according to the first embodiment. The vehicular lamp apparatus 100 is suitable for a marker lamp of a vehicle such as an automobile. In this embodiment, a case where the vehicular lamp apparatus 100 is used for rear combination lamps installed on a rear part of a vehicle will be described as an example.

The vehicular lamp apparatus 100 includes a pair of first lamp unit 110R and second lamp unit 110L, and a lamp Electronic Control Unit (ECU) 200 that controls the lamp units 110. Also, the vehicle is equipped with a vehicle ECU 300 as a controller that comprehensively controls the entire vehicle or part thereof. The vehicle ECU 300 may be a controller also referred to as a BCM (Body Control Module). An ECU may be implemented by a combination of a processor (hardware), such as a CPU (Central Processing Unit) or a microcontroller, and a software program executed by the processor (hardware).

In FIG. 1, for convenience, communication lines are indicated by dotted arrows connecting functional blocks. The lamp ECU 200 can communicate with the vehicle ECU 300 via an in-vehicle network that conforms to a network protocol, such as the CAN (Controller Area Network) or LIN (Local Interconnect Network), or any other appropriate communication network. Also, the lamp ECU 200 can communicate with the lamp units 110 via an appropriate communication network. The communication between the lamp ECU 200 and the vehicle ECU 300 and the communication between the lamp ECU 200 and the lamp units 110 may conform to protocols different from each other or may conform to the same protocol.

In FIG. 1, for convenience, electricity supply lines are indicated by solid lines connecting functional blocks. The lamp ECU 200 and the vehicle ECU 300 receive electricity supplied from a power supply 310, such as a vehicle-mounted battery. The lamp ECU 200 supplies electricity to the lamp units 110. The lamp ECU 200 can be regarded as the power source for the lamp units 110.

For example, the communication line between the lamp ECU 200 and the vehicle ECU 300 is illustrated with the reference numeral 302. The communication line 302 and other communication lines are, for example, wire harnesses. The ECUs or an ECU and a lamp unit 110 are connected by a wire harness such as to communicate with each other. The wire harnesses may also include electricity supply lines.

The first lamp unit 110R includes multiple first lamps that respectively provide lamp functions different from each other, which are a tail lamp 120a, a stop lamp 120b, a turn signal lamp 120c, and a backup lamp 120d in this example. Similarly, the second lamp unit 110L includes multiple second lamps 120a-120d that respectively provide lamp functions different from each other. The vehicular lamp apparatus 100 includes pairs of first lamps and second lamps, in which each pair of lamps provide the same lamp function. The first lamps are arranged together, and the second lamps are also arranged together such as to correspond to the arrangement of the first lamps. The first lamp unit 110R may be a rear combination lamp on the right side, and the second lamp unit 110L may be a rear combination lamp on the left side.

Each of the first lamp unit 110R and the second lamp unit 110L also includes a lighting circuit 130 that individually turns on the lamps 120a-120d belonging to the lamp unit, under the control of the lamp ECU 200. Each lighting circuit 130 includes a lighting control IC (Integrated Circuit) (an LED driver) that can individually control the luminance and turning on and off of a light emitting element (an LED, for example) of each of the lamps 120a-120d.

In this embodiment, each lighting circuit 130 is a lighting circuit in common for the multiple types of lamps 120a-120d belonging to the corresponding lamp unit 110. This has the advantage of using a common communication line and a common electricity supply line connecting each lighting circuit 130 and the lamp ECU 200 and thereby consolidating the communication lines and electricity supply lines for the multiple types of lamps and reducing the number of wires. It also has the advantage of facilitating the lighting of the multiple types of lamps in cooperation with each other and thereby facilitating the realization of various lighting modes, such as various effective lighting.

It is not essential that each lighting circuit 130 is a common lighting circuit. In an embodiment, each lamp unit 110 may have a typical configuration such that a separate lighting circuit is provided for each lamp, each lighting circuit is connected to the lamp ECU 200 by a separate communication line and a separate electricity supply line, and a corresponding lamp is individually operated under the control of the lamp ECU 200.

The lamp ECU 200 includes an acceleration sensor 202, a processor 210, a memory 220, and a communication circuit 230.

The acceleration sensor 202 generates information (hereinafter, also referred to as acceleration sensor information) indicating vehicle acceleration (including deceleration) and provides the acceleration sensor information to the lamp ECU 200. The acceleration sensor 202 is built into the lamp ECU 200. The acceleration sensor 202 may be, for example, a capacitive MEMS accelerometer or may be any other type of acceleration sensor.

The acceleration sensor 202 is configured to measure acceleration along at least one axis (e.g., a longitudinal direction of the vehicle). The acceleration sensor 202 may be configured to measure acceleration along at least two axes (e.g., a longitudinal direction and a width direction of the vehicle) or may be configured to measure acceleration along three axes.

The acceleration sensor 202 and other components within the lamp ECU 200, such as the processor 210, are connected by internal wiring 204 such as to communicate with each other. The acceleration sensor 202 outputs the generated acceleration sensor information to the processor 210 or other components of the lamp ECU 200 through the internal wiring 204.

For example, the acceleration sensor 202 and the processor 210 may be separate components mounted on the same printed circuit board, and the internal wiring 204 may be a wiring pattern formed on the board to connect the acceleration sensor 202 and the processor 210 such as to enable communication therebetween. Alternatively, the acceleration sensor 202 and other components within the lamp ECU 200, such as the processor 210, may be integrally formed as a microcontroller or an SoC (System on Chip), and the internal wiring 204 may be internal wiring of the microcontroller or SoC.

The processor 210 includes a detector 212 that detects a communication abnormality between the lamp ECU 200 and the vehicle ECU 300, and a controller 214 that controls the lamp units 110. The detector 212 and the controller 214 are implemented in the processor 210 when the processor 210 executes a software program stored in the memory 220. The memory 220 may include a non-volatile memory and/or a volatile memory. The memory 220 stores, besides the software program, data necessary for the operation of the lamp ECU 200 and the execution of the software program, and data generated by the execution of the software program. The lamp ECU 200 may be configured to enable update of the software program and/or data necessary for the execution thereof, via OTA (Over The Air) or wired communication, for example.

The detector 212 is configured to detect whether or not the reception of vehicle information from the vehicle ECU 300 is interrupted. The detector 212 may monitor the communication state of the communication line 302 connecting the lamp ECU 200 and the vehicle ECU 300 and may detect interruption in the reception of the vehicle information based on the communication state. For example, the detector 212 may detect interruption in the reception of the vehicle information when there is no reception of the vehicle information from the vehicle ECU 300 for a predetermined period of time. The detector 212 may also be configured to perform an existing method for detecting a communication abnormality between the lamp ECU 200 and the vehicle ECU 300.

The communication circuit 230 is an interface for communication with the vehicle ECU 300. Although the detector 212 is built in the processor 210 in the illustrated example, the configuration is not limited thereto, and the communication circuit 230 may function as the detector 212.

The lamp ECU 200 is configured to receive the vehicle information from the vehicle ECU 300 and control each of the lamps 120a-120d of each lamp unit 110 based on the vehicle information thus received. More specifically, the controller 214 selects one of the multiple lamps 120a-120d according to a lighting instruction included in the received vehicle information, generates a control signal for controlling the selected lamp, and provides the control signal to the lighting circuit 130 of the corresponding lamp unit 110.

The vehicle information includes, for example, a lighting instruction for the tail lamps 120a generated in response to the driver's light switch operation, a lighting instruction for the stop lamps 120b generated in response to the driver's brake operation, a lighting instruction for a turn signal lamp 120c generated in response to the driver's direction indicator switch operation, and shift information indicating the shift position (e.g., whether the shift position is reverse (R) or not).

The controller 214 has functions to: determine whether or not the lamps 120a-120d of a lamp unit 110 can be turned on; select a lamp to be turned on; perform dimming control for the lamp to be turned on {e.g., calculation of the duty ratio of PWM (Pulse Width Modulation) dimming, or calculation of the magnitude of the current value to be supplied to a light emitting element}; and transmit a command value used to perform dimming control (e.g., a command value of the duty ratio or a current value) to the corresponding lighting circuit 130.

Accordingly, when the vehicle information includes a lighting instruction for the tail lamps 120a, the controller 214 turns on the tail lamps 120a at predetermined brightness. When the vehicle information includes a lighting instruction for the stop lamps 120b, the controller 214 turns on the stop lamps 120b more brightly than the tail lamps 120a. When the vehicle information includes a lighting instruction for a turn signal lamp 120c, the controller 214 blinks the turn signal lamp 120c. When the vehicle information includes shift information indicating that the shift position is reverse (R), the controller 214 turns on the backup lamps 120d.

The lamp ECU 200 is also configured to control each of the lamps 120a-120d of each lamp unit 110 based on the acceleration sensor information output from the acceleration sensor 202. More specifically, the controller 214 grasps, based on the acceleration sensor information, the current vehicle traveling state, such as traveling, turning, stopping, or the like, or predicts the vehicle traveling state immediately thereafter. Further, the controller 214 selects one of the multiple lamps 120a-120d based on the identified traveling state, generates a control signal for controlling the selected lamp, and provides the control signal to the lighting circuit 130 of the corresponding lamp unit 110.

Figure 2:
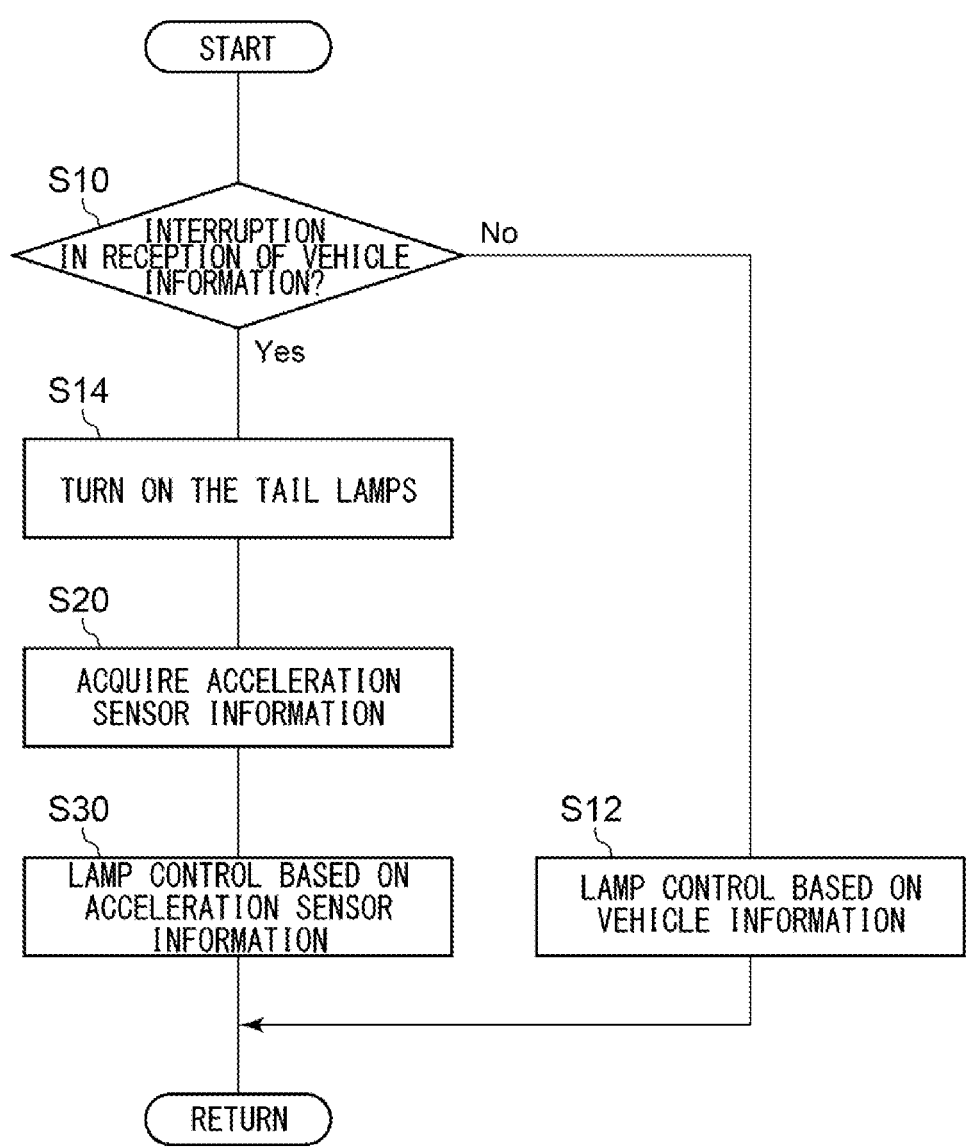
FIG. 2 is a flowchart that shows a control method for the vehicular lamp apparatus according to the first embodiment.

FIG. 2 is a flowchart that shows a control method for the vehicular lamp apparatus 100 according to the first embodiment. This method is repeatedly performed by the lamp ECU 200 with a predetermined period (such as a period of several milliseconds to several tens of milliseconds).

This method includes: detecting whether or not the reception of the vehicle information used to control the lamp units 110 is interrupted (S10); acquiring information indicating the vehicle acceleration from the acceleration sensor 202 (S20); and controlling, when interruption in the reception of the vehicle information is detected, the lamp units 110 based on the vehicle acceleration (S30).

When the method is started, as shown in FIG. 2, the detector 212 detects whether or not the reception of the vehicle information from the vehicle ECU 300 is interrupted (S10). When interruption in the reception of the vehicle information is not detected, i.e., when the lamp ECU 200 is receiving the vehicle information from the vehicle ECU 300 (No at S10), the controller 214 selects a lamp according to a lighting instruction included in the received vehicle information from among the multiple lamps 120a-120d and controls the lamp thus selected (S12). When the received vehicle information does not include a lighting instruction for any of the lamps, the controller 214 turns off the multiple lamps 120a-120d. This is normal operation of the vehicular lamp apparatus 100.

When the detector 212 has detected interruption in the reception of the vehicle information (Yes at S10), on the other hand, the controller 214 turns on the tail lamps 120a (S14). Thus, even when the lamp ECU 200 cannot acquire the vehicle information from the vehicle ECU 300, the vehicular lamp apparatus 100 can automatically turn on the tail lamps 120a without waiting for a lighting instruction for the tail lamps 120a from the vehicle ECU 300. Even if the reception of the vehicle information is interrupted at night, the tail lamps 120a can be certainly turned on. This helps improving safety, especially at night.

The lamp ECU 200 acquires the acceleration sensor information from the acceleration sensor 202 (S20). Subsequently, the lamp ECU 200 controls the lamp units 110 based on the acceleration sensor information (S30). The controller 214 grasps the current vehicle traveling state based on the acquired acceleration sensor information, selects a lamp suitable for the grasped traveling state from among the multiple lamps 120a-120d, and controls the lamp.

For example, when the acceleration sensor 202 can measure the acceleration in a longitudinal direction of the vehicle, the acceleration sensor information can indicate the measured acceleration in a longitudinal direction of the vehicle. Therefore, using the acceleration sensor information, the controller 214 can grasp whether or not the vehicle is decelerating based on the acceleration in a longitudinal direction of the vehicle. When the vehicle is decelerating, it is considered that the brake operation is performed, and the controller 214 turns on the stop lamps 120b.

Based on the magnitude of the measured acceleration (deceleration) in a longitudinal direction of the vehicle, the controller 214 can determine whether the vehicle's deceleration is due to emergency braking or normal brake operation. For example, when the magnitude of the measured deceleration in a longitudinal direction of the vehicle exceeds a first deceleration threshold representing emergency braking, the controller 214 may judge that emergency braking is being performed. When the measured deceleration in a longitudinal direction of the vehicle falls below the first deceleration threshold, the controller 214 may judge that it is a normal brake operation. When emergency braking is detected in this way, the controller 214 may light the lamp units 110 such as to indicate emergency braking, e.g., high flasher (high-speed blinking) of the stop lamps 120*b*.

Further, a second deceleration threshold greater than the first deceleration threshold may be set in advance. If large deceleration exceeding the second deceleration threshold is measured, it may be due to a collision between the vehicle and another vehicle or a surrounding structure. Therefore, when the measured deceleration in a longitudinal direction of the vehicle exceeds the second deceleration threshold, the controller 214 may light the lamp units 110 such as to indicate the occurrence of a collision or a possibility thereof, such as high flasher of hazard lamps, i.e., the turn signal lamps 120*c* on both the left and right sides.

The controller 214 may determine whether or not the vehicle is moving backward based on the direction (forward or backward) of the measured acceleration (vector) in a longitudinal direction of the vehicle. When the measured acceleration in a longitudinal direction of the vehicle is directed frontward of the vehicle, the controller 214 may judge that the vehicle is moving forward. When the measured acceleration in a longitudinal direction of the vehicle is directed rearward of the vehicle, the controller 214 may judge that the vehicle is moving backward. When the vehicle is moving backward, the controller 214 turns on the backup lamps 120*d*.

When the acceleration sensor 202 can measure the acceleration in a vehicle width direction, the acceleration sensor information can indicate the measured acceleration in a vehicle width direction. Based on the measured acceleration in a vehicle width direction, the controller 214 can recognize a right or left turn or a lane change of the vehicle. In this case, the controller 214 may blink a turn signal lamp 120*c*.

During control of the vehicular lamp apparatus 100 based on the acceleration sensor information, the detector 212 may monitor whether or not the vehicle information is received from the vehicle ECU 300 and thereby may detect whether or not the reception of the vehicle information is restored. If the reception of the vehicle information is not restored and the interruption thereof is continued, the control based on the acceleration sensor information will also be continued. When the reception of the vehicle information is restored, the controller 214 may return the control to the normal control based on the vehicle information.

As described above, according to the present embodiment, the traveling state of the vehicle, such as decelerating, backing up, or turning right or left, can be grasped based on the acceleration sensor information, and a marker lamp appropriate for the state thus grasped can be turned on. Even when the lamp ECU 200 cannot acquire the vehicle information from the vehicle ECU 300 due to interruption in communication between the lamp ECU 200 and the vehicle ECU 300, the vehicular lamp apparatus 100 can be operated. Thus, the vehicular lamp apparatus 100 can be provided with a fail-safe function.

In the abovementioned embodiment, the acceleration sensor 202 is built into the lamp ECU 200. Accordingly, compared to the case where the acceleration sensor 202 is provided outside the lamp ECU 200 and where the acceleration sensor 202 and the lamp ECU 200 are connected to each other by wires such as wire harnesses, the risk of the lamp ECU 200 being unable to acquire the acceleration sensor information from the acceleration sensor 202 can be reduced. Therefore, the fail-safe function using the acceleration sensor 202 can be provided more certainly. However, the arrangement of the acceleration sensor 202 is not limited thereto, and the acceleration sensor 202 may be provided outside the lamp ECU 200. Such modifications will be described below.

Figure 3A:
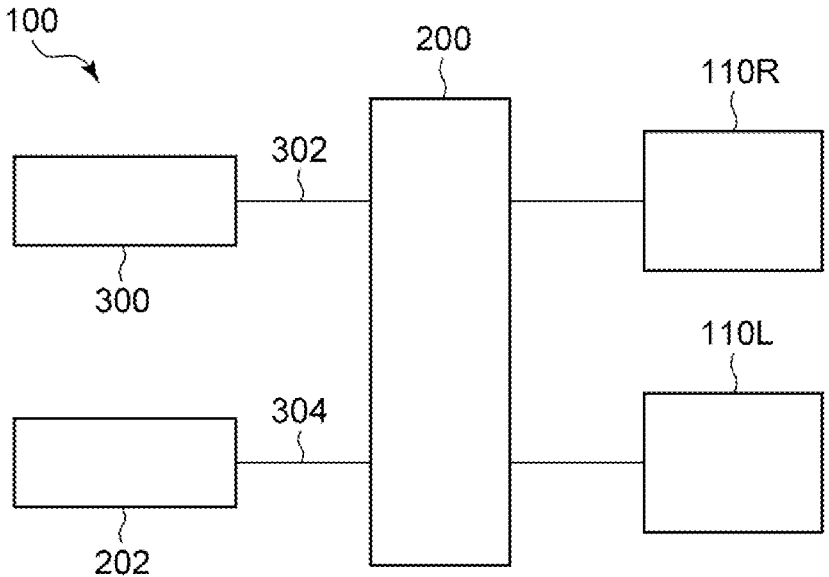
FIG. 3A and FIG. 3B are each a block diagram of a vehicular lamp apparatus according to a modification.
Figure 3B:
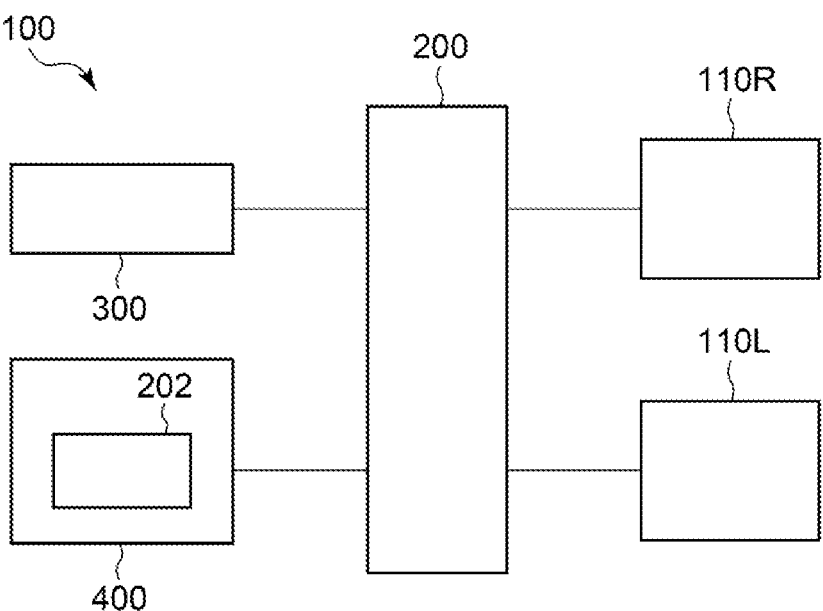

FIG. 3A and FIG. 3B are each a block diagram of the vehicular lamp apparatus 100 according to a modification. As shown in FIG. 3A, the acceleration sensor 202 may be disposed outside the lamp ECU 200 and provide the acceleration sensor information to the lamp ECU 200. For example, the acceleration sensor 202 may be connected to the lamp ECU by a communication line 304 (such as a wire harness) separate from the communication line 302 connecting the lamp ECU 200 and the vehicle ECU 300. The acceleration sensor 202 may transmit the acceleration sensor information to the lamp ECU 200 through the communication line 304. Thus, even when the lamp ECU 200 cannot acquire the vehicle information from the vehicle ECU 300, the vehicular lamp apparatus 100 can be operated based on the acceleration sensor information, as in the aforementioned embodiment.

As shown in FIG. 3B, an ECU (such as a meter ECU) 400 separate from the vehicle ECU 300 may be connected to the lamp ECU 200 such as to communicate therewith, and the ECU 400 may have acceleration sensor information (with the acceleration sensor 202 built therein, for example) and provide the acceleration sensor information to the lamp ECU 200. Alternatively, the acceleration sensor 202 may be provided outside the ECU 400 and connected to the ECU 400, and the acceleration sensor information may be provided from the acceleration sensor 202 to the ECU 400 and further provided from the ECU 400 to the lamp ECU 200. Alternatively, the acceleration sensor 202 (or another acceleration sensor) may be connected to the vehicle ECU 300, and the ECU 400 may acquire the acceleration sensor information from the vehicle ECU 300. Also in such cases, a fail-safe against interruption in communication between the lamp ECU 200 and the vehicle ECU 300 can be achieved.

Second Embodiment

Figure 4:
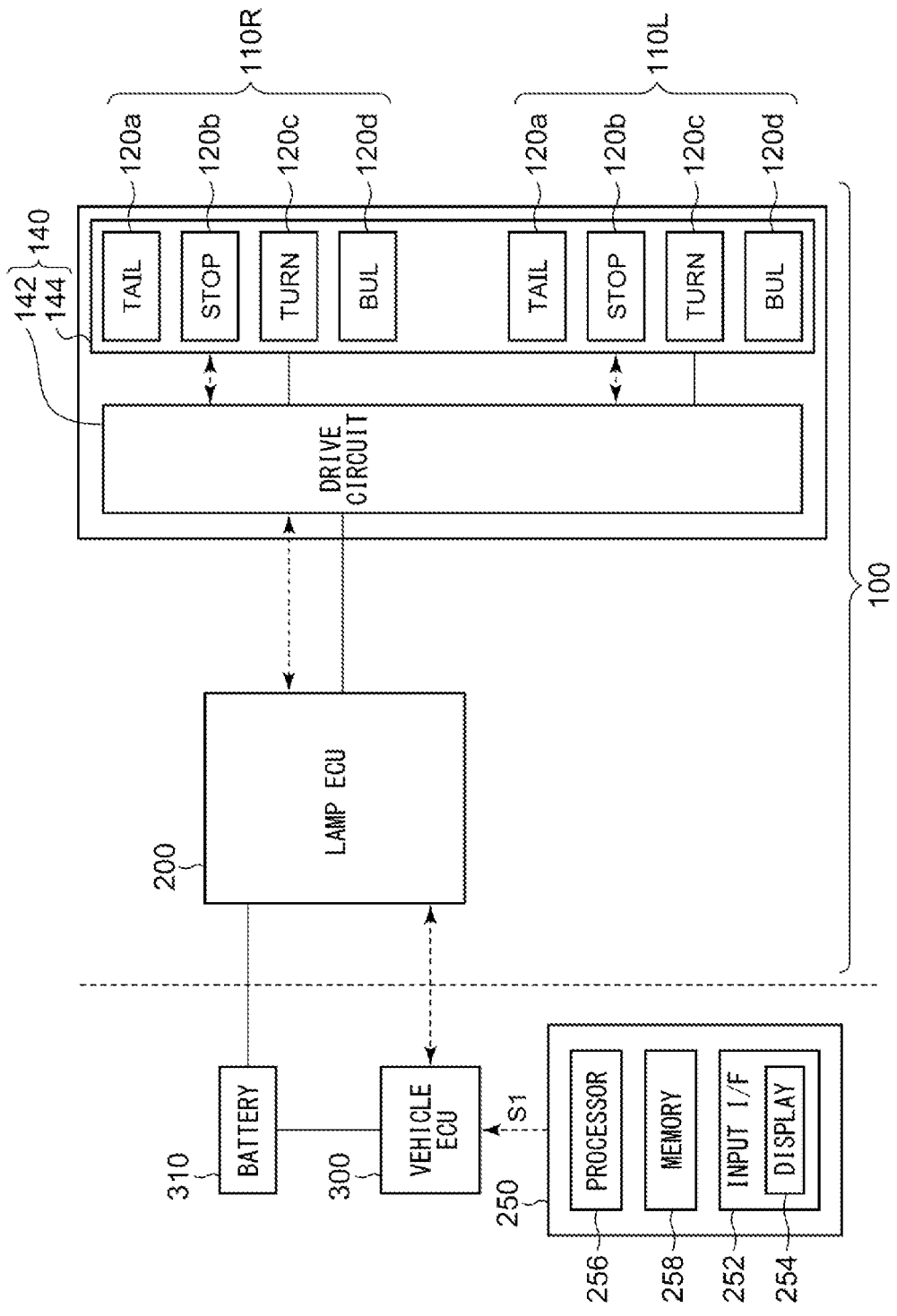
FIG. 4 is a block diagram of a vehicular lamp apparatus according to a second embodiment.

FIG. 4 is a block diagram of the vehicular lamp apparatus 100 according to the second embodiment. The vehicular lamp apparatus 100 is suitable for a marker lamp of a vehicle such as an automobile. In this embodiment, a case where the vehicular lamp apparatus 100 is used for rear combination lamps installed on a rear part of a vehicle will be described as an example.

The vehicular lamp apparatus 100 includes an array of a number of light emitting elements (such as high-definition LEDs or other LEDs), which is a display 140 in this example, and a lamp Electronic Control Unit (ECU) 200 that controls the display 140. The display 140, at least a partial region thereof, functions as a pair of first lamp unit 110R and second lamp unit 110L (which may hereinafter be collectively referred to as lamp units 110). In the embodiment, the first lamp unit 110R corresponds to a rear combination lamp on the right side, and the second lamp unit 110L corresponds to a rear combination lamp on the left side.

As shown in FIG. 4, a configurator 250 is provided for customization of the vehicular lamp apparatus 100 by a user (e.g., the driver or other occupants). The configurator 250, together with the vehicular lamp apparatus 100, constitute a vehicular lamp system according to the embodiment.

Although the details will be described later, in this embodiment, each of the lamp units 110 (i.e., the display 140) includes multiple marker lamp regions that each operate as a different marker lamp, and the arrangement of the multiple marker lamp regions can be customized. The configurator 250 receives a customization of the arrangement of the multiple marker lamp regions and generates a customized configuration S1 that indicates the customized arrangement of the multiple marker lamp regions. According to the customized configuration S1, the lamp ECU 200 defines multiple marker lamp regions in each lamp unit 110 and controls the lamp unit 110 so that the multiple marker lamp regions operate respectively as different marker lamps. An ECU may be implemented by a combination of a processor (hardware), such as a CPU (Central Processing Unit) or a microcontroller, and a software program executed by the processor (hardware).

Also, the vehicle is equipped with a vehicle ECU 300 as a controller that comprehensively controls the entire vehicle or part thereof. The vehicle ECU 300 may be a controller also referred to as a BCM (Body Control Module). The vehicle ECU 300, together with the lamp ECU 200, may be considered to constitute a controller that controls the lamp units 110. Also, the vehicle ECU 300, together with the vehicular lamp apparatus 100, may be considered to constitute a vehicular lamp system according to the embodiment.

In FIG. 4, for convenience, communication lines are indicated by dotted arrows connecting functional blocks. The lamp ECU 200 can communicate with the vehicle ECU 300 via an in-vehicle network that conforms to a network protocol, such as the CAN (Controller Area Network) or LIN (Local Interconnect Network), or any other appropriate communication network. Also, the vehicle ECU 300 can communicate with the configurator 250 via an appropriate communication network. The communication between the lamp ECU 200 and the vehicle ECU 300 and the communication between the configurator 250 and the vehicle ECU 300 may conform to protocols different from each other or may conform to the same protocol. Similarly, the lamp ECU 200 can communicate with the lamp units 110 via an appropriate communication network.

In FIG. 4, for convenience, electricity supply lines are indicated by solid lines connecting functional blocks. The lamp ECU 200 and the vehicle ECU 300 receive electricity supplied from the power supply 310, such as a vehicle-mounted battery. The lamp ECU 200 supplies electricity to the lamp units 110. The lamp ECU 200 can be regarded as the power source for the lamp units 110. The configurator 250 may be supplied with electricity by the power supply 310 or may include a battery to supply electricity to itself.

The display 140 includes a display drive circuit (display driver IC) 142 and a display panel 144. On the display panel 144, marker lamp regions corresponding to multiple marker lamps (which are the tail lamp 120a, stop lamp 120b, turn signal lamp 120c, and backup lamp 120d in this example) constituting the first lamp unit 110R are arranged according to the initial configuration (set by the manufacturer of the vehicular lamp apparatus 100 at the manufacturing stage, for example) or according to the customized configuration S1. Similarly, marker lamp regions corresponding to the multiple marker lamps 120a-120d constituting the second lamp unit 110L are also arranged on the display panel 144.

Figure 5A:
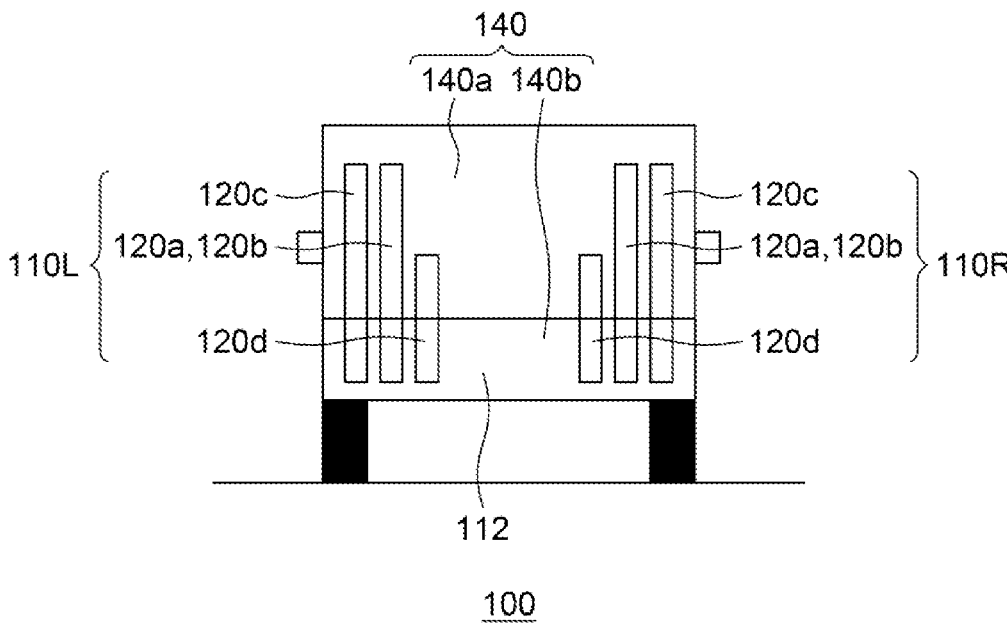
FIG. 5A and FIG. 5B are each a schematic diagram of an illustrative vehicular lamp apparatus.
Figure 5B:
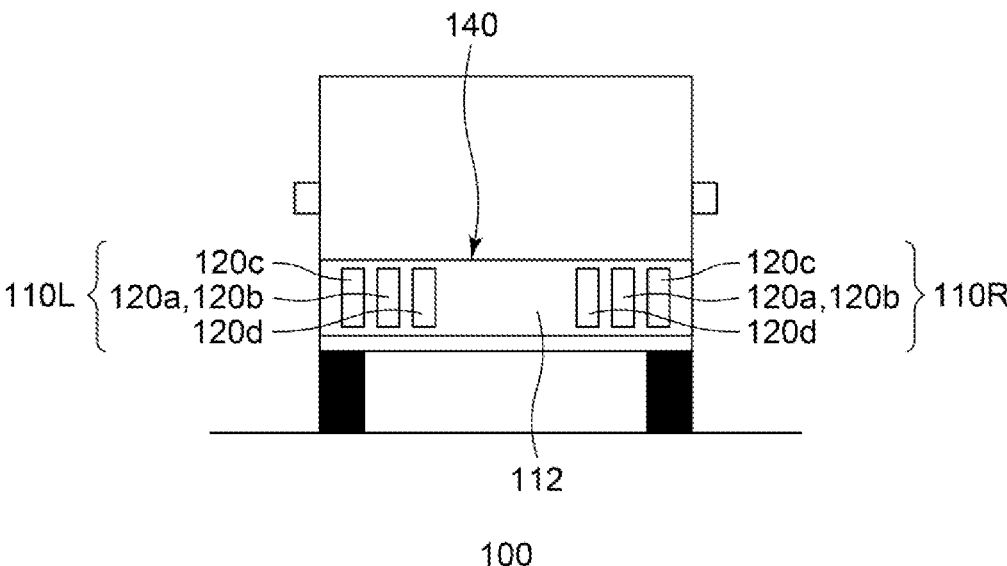

FIG. 5A and FIG. 5B are each a schematic diagram of an illustrative vehicular lamp apparatus 100. FIG. 5A and FIG.

5B each illustrate appearance of a rear part of a vehicle equipped with the vehicular lamp apparatus 100, viewed from the rear of the vehicle.

As an example, as shown in FIG. 5A, the vehicular lamp apparatus 100 may include one large display 140 that covers the entire surface of the rear part of the vehicle. On this display 140, the first lamp unit 110R may be disposed at the right end, and the second lamp unit 110L may be disposed at the left end. The first lamp unit 110R and the second lamp unit 110L each include marker lamp regions corresponding to the tail lamp 120a, stop lamp 120b, turn signal lamp 120c, and backup lamp 120d, as described above. Multiple marker lamp regions separated from each other are defined on the display 140 according to the initial configuration or the customized configuration S1, and each of the marker lamps 120a-120d is assigned to a corresponding marker lamp region. However, the tail lamp 120a and the stop lamp 120b have the same arrangement on the display 140.

In some cases, the display 140 may be constituted by multiple parts and may include, for example, a movable side display 140a installed on a movable part, such as a door that can be moved (opened or closed) with respect to the vehicle body, and a fixed side display 140b that is installed on a fixed part fixed to the vehicle body and that is adjacent to the movable side display 140a. Each of the marker lamp regions described above may be provided across both the movable side display 140a and the fixed side display 140b.

In the display 140, the region excluding the lamp units 110, i.e., the remaining region not used as the marker lamps 120a-120d, may be freely used as a free region 112 for various purposes, such as displaying various characters or figures and providing various decorative lighting.

As another example, as shown in FIG. 5B, the vehicular lamp apparatus 100 may include a long display 140 extending in a vehicle width direction along the lower edge of the rear part of the vehicle. This display 140 extends to be laterally elongated across the entire vehicle in a vehicle width direction. On the display 140, the first lamp unit 110R may be disposed at the right end, and the second lamp unit 110L may be disposed at the left end. Each lamp unit 110 may include marker lamp regions corresponding to the tail lamp 120a, stop lamp 120b, turn signal lamp 120c, and backup lamp 120d. On the display 140, a central part between the first lamp unit 110R and the second lamp unit 110L may be used as the free region 112.

Although the display 140 may be a single large display that includes both the first lamp unit 110R and the second lamp unit 110L, it is not essential. The vehicular lamp apparatus 100 may include a first display that operates as the first lamp unit 110R, and a second display that operates as the second lamp unit 110L.

Also, the vehicular lamp apparatus 100 may include a third lamp unit different from the first lamp unit 110R and the second lamp unit 110L. Therefore, the display 140 may operate as the third lamp unit as well as the first lamp unit 110R and the second lamp unit 110L. The third lamp unit may be, for example, a high-mounted stop lamp or another lamp unit provided on a rear part of the vehicle. Also, part of the free region 112 may operate as the third lamp unit.

Referring again to FIG. 4, the lamp ECU 200 can operate as a controller that controls the lamp units 110. The lamp ECU 200 is configured to receive the vehicle information from the vehicle ECU 300 and provide, on the display 140, each of the marker lamps 120a-120d of each lamp unit 110 based on the vehicle information thus received. More specifically, the lamp ECU 200 selects a marker lamp to be operated from among the multiple marker lamps 120a-120d according to a lighting instruction included in the received vehicle information, generates a control signal for displaying the selected marker lamp on the display 140, and provides the control signal to the display drive circuit 142. Under the control of the lamp ECU 200, the display drive circuit 142 controls the display panel 144 so that an image representing each marker lamp is displayed, according to the initial configuration or the customized configuration S1 described above.

The vehicle information includes, for example, a lighting instruction for the tail lamps 120*a* generated in response to the driver's light switch operation, a lighting instruction for the stop lamps 120*b* generated in response to the driver's brake operation, a lighting instruction for a turn signal lamp 120*c* generated in response to the driver's direction indicator switch operation, and shift information indicating the shift position (e.g., whether the shift position is reverse (R) or not).

Accordingly, when the vehicle information includes a lighting instruction for the tail lamps 120*a*, the lamp ECU 200 controls the display 140 to turn on the tail lamps 120*a* at predetermined brightness. When the vehicle information includes a lighting instruction for the stop lamps 120*b*, the lamp ECU 200 controls the display 140 to turn on the stop lamps 120*b* more brightly than the tail lamps 120*a*. When the vehicle information includes a lighting instruction for a turn signal lamp 120*c*, the lamp ECU 200 controls the display 140 to blink the turn signal lamp 120*c*. When the vehicle information includes shift information indicating that the shift position is reverse (R), the lamp ECU 200 controls the display 140 to turn on the backup lamps 120*d*.

The configurator 250 is configured to receive a customization of the arrangement of the multiple marker lamp regions and generate the customized configuration S1 that indicates the customized arrangement of the multiple marker lamp regions. The configurator 250 is also configured to, when receiving the customization, display a settable area (such as settable areas 50*a* and 52*a* shown in FIG. 7) that can be used as a marker lamp region for each marker lamp.

The configurator 250 includes: an input interface 252 that receives a customization of the arrangement of multiple marker lamp regions; a display 254 that displays, when customization is received, a settable area that can be used as a marker lamp region for each marker lamp; a processor 256 that generates the customized configuration S1 indicating the customized arrangement of the multiple marker lamp regions; and a memory 258.

The input interface 252 may be a display that receives input from a user, such as a touch panel display or an interactive display. In this case, the display 254 may constitute part of the input interface 252. Alternatively, the input interface 252 may be any other suitable input means operable by a user, through which the user inputs his or her desired arrangement of the marker lamp regions to the configurator 250.

A customization assistance function of the configurator 250, such as displaying a settable area on the display 254, can be implemented in the processor 256 when the processor 256 executes a software program stored in the memory 258. The memory 258 may include a non-volatile memory and/or a volatile memory. The memory 258 may store, besides the software program, data necessary for the operation of the configurator 250 and the execution of the software program, and data generated by the execution of the software program.

When customization is received, the processor 256 may also display, along with a settable area, a non-settable area (such as non-settable areas 50*b* and 52*b* shown in FIG. 7) that cannot be used as a marker lamp region for each marker lamp. Accordingly, the user can grasp a settable area and a non-settable area. Therefore, it becomes easier for the user to customize a vehicular lamp such as to satisfy the legal requirements.

The processor 256 may receive a customization of the arrangement and a lighting mode of multiple marker lamp regions, and the customized configuration may indicate the customized arrangement and lighting mode of the multiple marker lamp regions. The arrangement of a marker lamp region may include, for example, the position, area, and shape of the marker lamp region, or a combination thereof. The lighting mode of a marker lamp region may include, for example, the brightness, lighting timing, color, and animation (e.g., gradual change in brightness or sequential lighting) of the marker lamp region, or a combination thereof. Accordingly, the user can change not only the arrangement of a marker lamp region but also the lighting mode thereof. Therefore, the user can customize a vehicular lamp so that it suits his or her preference even more, which can lead to further improvement of user satisfaction.

As an example, the configurator 250 may be an operation panel mounted in the vehicle cabin. Alternatively, the configurator 250 may be a mobile terminal (such as a smartphone) carried by the user.

The configurator 250 may be connected to the vehicle ECU 300 by wired means. The configurator 250 may be connected to the vehicle ECU 300 when the user customizes the vehicular lamp apparatus 100 and may be removed from the vehicle ECU 300 after the customization is completed. Instead of the configurator 250 being temporarily connected to the vehicle ECU 300 in this way, the configurator 250 may be permanently connected to the vehicle ECU 300 or may be integrated with the vehicle ECU 300. Alternatively, the configurator 250 may be wirelessly connected to the vehicle ECU 300. In this case, the connection between the configurator 250 and the vehicle ECU 300 may be established when the user customizes the vehicular lamp apparatus 100, and the configurator 250 may be disconnected from the vehicle ECU 300 after the customization is completed.

Also, the configurator 250 may be connected to the lamp ECU 200, instead of the vehicle ECU 300, by wired or wireless means. In this case, the lamp ECU 200 can acquire the customized configuration generated by the configurator 250 directly from the configurator 250.

Figure 6:
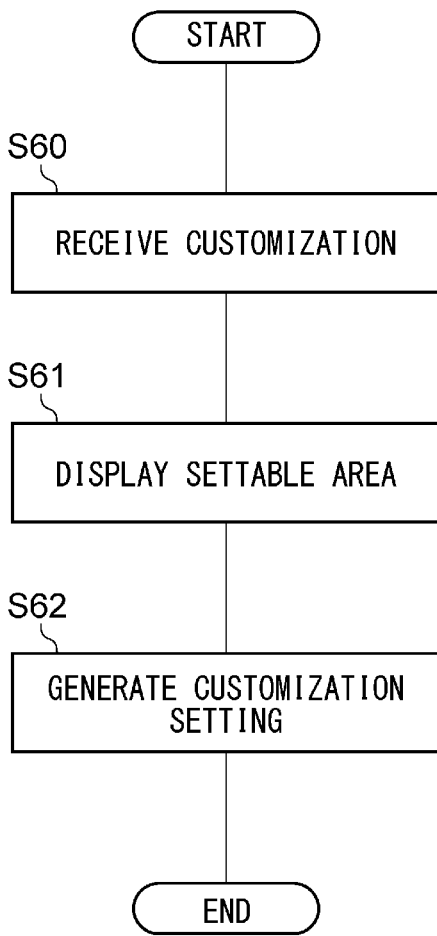
FIG. 6 is a flowchart that shows a setting method for the vehicular lamp apparatus according to the second embodiment.

FIG. 6 is a flowchart that shows a setting method for the vehicular lamp apparatus 100 according to the second embodiment. This method includes: receiving, in the configurator 250, a customization of the arrangement of multiple marker lamp regions (S60); displaying, on the configurator 250 when the customization is received, a settable area that can be used as a marker lamp region for each marker lamp (S61); and generating, by the configurator 250, the customized configuration S1 indicating the customized arrangement of the multiple marker lamp regions (S62). The customized configuration S1 thus generated is transmitted from the configurator 250 to the lamp ECU 200 via the vehicle ECU 300 and stored in the lamp ECU 200, as shown in FIG. 4. Thus, the lamp ECU 200 can acquire the customized configuration S1 from the vehicle ECU 300 and perform the subsequent control of the vehicular lamp apparatus 100 according to the customized configuration S1.

Figure 7A:
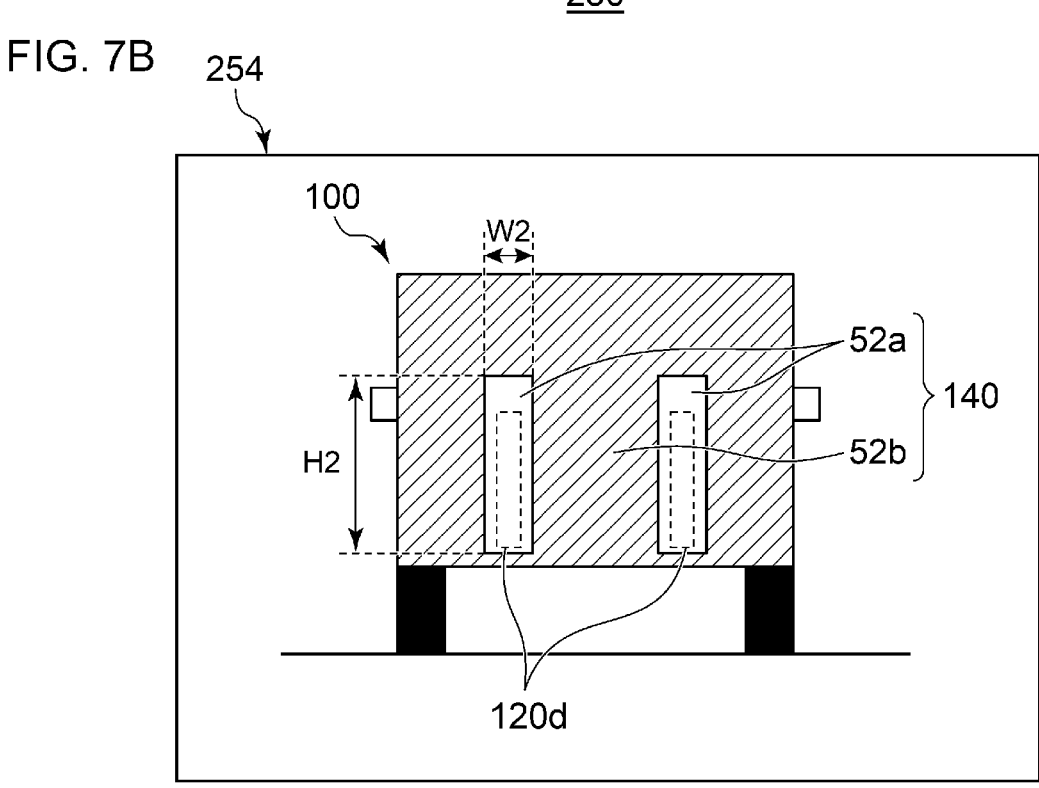

FIG. 7A and FIG. 7B are each a schematic diagram that shows an example of a settable area and a non-settable area according to the second embodiment. FIG. 7A illustrates settable areas 50*a* and a non-settable area 50*b* for the tail lamps 120*a*, and FIG. 7B illustrates settable areas 52*a* and a non-settable area 52*b* for the backup lamps 120*d*. The settable areas 50*a* and the non-settable area 50*b* shown in FIG. 7A are also applicable to the stop lamps 120*b* and the turn signal lamps 120*c*.

As shown in FIG. 7A, the settable areas 50*a* and the non-settable area 50*b* for the tail lamps 120*a* set on the display 140 of the vehicular lamp apparatus 100 are displayed on the display 254 of the configurator 250. A settable area 50*a* represents a range on the display 140 in which placement of a tail lamp 120*a* is legally permissible. As an example, each settable area 50*a* has prescribed height H1 and width W1 based on the regulations. For the left and right tail lamps, the settable areas 50*a* are defined respectively at the left end and the right end on the display 140. In each settable area 50*a*, the user is allowed to place a tail lamp 120*a*. Therefore, as indicated by the dotted lines in FIG. 7A, the user can set at least part of each settable area 50*a* as a tail lamp 120*a*.

Meanwhile, the non-settable area 50*b*, shown as the diagonally shaded area in the drawing, corresponds to the remaining region on the display 140 excluding the settable areas 50*a*. In the non-settable area 50*b*, placement of the tail lamps 120*a* is not legally permissible. Therefore, in the non-settable area 50*b*, the user is prohibited from placing the tail lamps 120*a*.

Similarly, as shown in FIG. 7B, the settable areas 52*a* and the non-settable area 52*b* for the backup lamps 120*d* may also be displayed on the display 254 of the configurator 250. A settable area 52*a* is a range in which placement of a backup lamp 120*d* is legally permissible and has prescribed height H2 and width W2 based on the regulations. The settable areas 52*a* for the backup lamps 120*d* may be defined at locations different from the settable areas 50*a* for the tail lamps 120*a*. In each settable area 52*a*, the user is allowed to place a backup lamp 120*d*, so that, as indicated by the dotted lines in FIG. 7B, the user can set at least part of each settable area 52*a* as a backup lamp 120*d*. On the other hand, in the non-settable area 52*b* shown as the diagonally shaded area in the drawing, placement of the backup lamps 120*d* is not legally permissible, so that the user is prohibited from placing the backup lamps 120*d* in the non-settable area 52*b*.

The setting method shown in FIG. 6 may include a step of verifying the customized configuration S1 after generating the customized configuration S1. More specifically, the configurator 250 may verify whether or not the customized arrangement (and/or lighting mode) of a marker lamp region indicated by the customized configuration S1 satisfies the legal requirements.

When the customized configuration S1 passes the verification, the customized configuration S1 is transmitted from the configurator 250 to the vehicle ECU 300 and is used in the lamp ECU 200 for the control of the vehicular lamp apparatus 100.

When the customized configuration S1 fails the verification, on the other hand, the configurator 250 may notify the user of the failure and accept resetting. When the customized configuration S1 is input again, the configurator 250 may perform the verification step again. When resetting is not made, the configurator 250 need not adopt the customized configuration S1 input this time and may maintain the original setting. This can avoid a situation where, for example, a region set by the user is too small and does not satisfy the requirements due to insufficient brightness.

According to this embodiment, as described above, when receiving the customization of the vehicular lamp apparatus 100 by the user, the configurator 250 displays a settable area and a non-settable area for each marker lamp. Therefore, the user can customize the arrangement of a marker lamp region while grasping the settable area and the non-settable area. These areas can be defined in advance according to the legal requirements. Therefore, with the configurator 250, it is possible to assist a user to customize the vehicular lamp apparatus 100 while satisfying the legal requirements.

The present invention is not limited to the embodiments and modifications described above. The embodiments and modifications may be combined, and further variations including various design modifications may be added based on the knowledge of those skilled in the art. Embodiment and modifications obtained by such combination or addition of further variations also fall within the scope of the present invention. Any new embodiment made by a combination among the above-mentioned embodiments and modifications or a combination among the above-mentioned embodiments, modifications, and the following variations has the effect of each of the combined embodiments, modifications, and further variations.

For example, the vehicular lamp apparatus 100 may include a third lamp unit different from the first lamp unit 110R and the second lamp unit 110L. The lamp ECU 200 may control the third lamp unit in the same manner as in the aforementioned embodiments. That is, the lamp ECU 200 may control the third lamp unit based on the vehicle information from the vehicle ECU 300 in normal times and based on the acceleration sensor information from the acceleration sensor 202 when the communication between the lamp ECU 200 and the vehicle ECU 300 is interrupted. The third lamp unit may be, for example, a high-mounted stop lamp or another lamp unit provided on a rear part of the vehicle.

The aforementioned embodiments describe, as an example, the case where the vehicular lamp apparatus 100 is used for rear lamps. However, the installation location of the vehicular lamp apparatus 100 according to each embodiment is not specified. Therefore, the vehicular lamp apparatus 100 may be used for a vehicular lamp installed at the front or any other part of a vehicle. The vehicular lamp apparatus 100 is not limited to the lamps 120*a*-120*d* illustrated in the aforementioned embodiments and may be used for various vehicle marker lamps or other vehicular lamps, such as clearance lamps, daytime running lamps, cornering lamps, and front fog lamps.

In the aforementioned embodiments, each lamp unit 110 has a form including multiple individual lamps (such as multiple marker lamps) that respectively provide lamp functions different from each other. However, the form is not limited thereto. For example, each lamp unit 110 may include a display that provides multiple lamp functions different from each other; then, multiple regions separated from each other may be defined on the display, and each of the lamp functions may be assigned to a corresponding region. For example, four regions may be defined on the display, and the tail lamp 120*a*, stop lamp 120*b*, turn signal lamp 120*c*, and backup lamp 120*d* may be assigned respectively to these regions. Alternatively, each lamp unit 110 may be a composite type in which at least one individual lamp and a display assigned at least one lamp function are combined.

In the aforementioned embodiments, the customization of the arrangement (position, area, shape, and the like) of a marker lamp region is entrusted to the user, as long as it is within the settable area. Unlike this, in one embodiment, when receiving the customization for a marker lamp, the configurator 250 may display, on the display 254, multiple predetermined selectable candidates for the settable area.

For each candidate, arrangement (position, area, shape, and the like) is determined in advance. The user may select one of the candidates, and the selected candidate may be set as the marker lamp region.

The aforementioned embodiments describe, as an example, the case where the controller for controlling the vehicular lamp apparatus 100 is the lamp ECU 200. However, the present invention is not limited thereto. The controller may be configured to control not only the lamps 120a-120d but also other electrical components mounted on the vehicle. The controller may be a controller also referred to as a zone ECU, which comprehensively controls all or some of various electrical components arranged in a specific zone when the vehicle is divided into multiple zones. In addition to lamps, the electrical components may include windshield wipers, a back door opener, seat heaters, a glass hatch, a rear window defogger, a backup camera, a sensor cleaner for a backup camera, a snow melting heater, a fuel lid motor, rear door lock motors, power windows, and sensors including a millimeter-wave radar.

The present invention has been described using specific terms based on the embodiments. However, the embodiments only show one aspect of the principle and application of the present invention, and various modifications or changes in arrangement may be made to the embodiments without departing from the spirit of the present invention defined in the claims.

What is claimed is:

1. A vehicular lamp apparatus, comprising:
a lamp unit;
a controller that controls the lamp unit based on vehicle information received from a vehicle controller; and
an acceleration sensor that provides information indicating vehicle acceleration to the controller,
wherein the controller detects whether or not reception of the vehicle information is interrupted and controls the lamp unit based on the vehicle acceleration when interruption in the reception of the vehicle information is detected, and
wherein the controller is structured to detect whether the reception of the vehicle information is restored while controlling the lamp unit based on the vehicle acceleration, and to return control of the lamp unit to being based on the vehicle information when the reception of the vehicle information is restored.

2. The vehicular lamp apparatus according to claim 1, wherein the acceleration sensor is built into the controller.

3. The vehicular lamp apparatus according to claim 1, wherein the lamp unit comprises a plurality of marker lamps that provide lamp functions different from each other, and
wherein the controller selects a marker lamp from among the plurality of marker lamps based on the vehicle acceleration and controls the marker lamp thus selected.

4. The vehicular lamp apparatus according to claim 1, wherein the lamp unit comprises a tail lamp, and
wherein the controller turns on the tail lamp when the interruption in the reception of the vehicle information is detected.

5. A control device for a vehicular lamp apparatus, the control device comprising:
an Electronic Control Unit (ECU) that controls a lamp unit based on vehicle information received from a vehicle controller; and
an acceleration sensor that provides information indicating vehicle acceleration to the ECU,
wherein the ECU detects whether or not reception of the vehicle information is interrupted and controls the lamp unit based on the vehicle acceleration when interruption in the reception of the vehicle information is detected, and
wherein the ECU is structured to detect whether the reception of the vehicle information is restored while controlling the lamp unit based on the vehicle acceleration, and to return control of the lamp unit to being based on the vehicle information when the reception of the vehicle information is restored.

6. A control method for a vehicular lamp apparatus, the control method comprising:
detecting whether or not reception of vehicle information for use in control of a lamp unit is interrupted;
acquiring information indicating vehicle acceleration from an acceleration sensor;
controlling the lamp unit based on the vehicle acceleration when interruption in the reception of the vehicle information is detected,
detecting whether the reception of the vehicle information is restored while controlling the lamp unit based on the vehicle acceleration, and
returning control of the lamp unit to being based on the vehicle information when the reception of the vehicle information is restored.

* * * * *